US012430852B2

United States Patent
Chen et al.

(10) Patent No.: US 12,430,852 B2
(45) Date of Patent: Sep. 30, 2025

(54) SHAPE MODIFICATION FOR SELF-SUPPORTING STRUCTURES IN ADDITIVE MANUFACTURING

(71) Applicant: Palo Alto Research Center Incorporated, Palo Alto, CA (US)

(72) Inventors: Jiangce Chen, Mansfield Center, CT (US); Morad Behandish, San Mateo, CA (US); Matt Patterson, Raleigh, NC (US)

(73) Assignee: Xerox Corporation, Norwalk, CT (US)

( * ) Notice: Subject to any disclaimer, the term of this patent is extended or adjusted under 35 U.S.C. 154(b) by 93 days.

(21) Appl. No.: 18/049,577

(22) Filed: Oct. 25, 2022

(65) Prior Publication Data

US 2024/0185529 A1 Jun. 6, 2024

(51) Int. Cl.
  G06T 17/20 (2006.01)
  B33Y 50/00 (2015.01)
  G05B 19/4099 (2006.01)
  G06T 19/20 (2011.01)

(52) U.S. Cl.
  CPC .......... G06T 17/205 (2013.01); B33Y 50/00 (2014.12); G05B 19/4099 (2013.01); G06T 19/20 (2013.01); G05B 2219/49023 (2013.01); G06T 2219/2021 (2013.01)

(58) Field of Classification Search
  None
  See application file for complete search history.

(56) References Cited

U.S. PATENT DOCUMENTS

2020/0342067 A1* 10/2020 Yu ........................... G06F 30/20
2021/0299962 A1*  9/2021 Qian ..................... B29C 64/393

OTHER PUBLICATIONS

Simone Cacace, Emiliano Cristiani, Leonardo Rocchi, "A level set based method for fixing overhangs in 3D printing", Apr. 13, 2017, Elsevier, Applied Mathematical Modeling, vol. 44, pp. 446-455.*
Asger Nyman Christiansen, J. Andreas Bærentzen, Morten Nobel-Jørgensen, Niels Aage, Ole Sigmund, "Combined shape and topology optimization of 3D structures", Feb. 2015, Elsevier, Computers & Graphics, vol. 46, pp. 25-35.*

(Continued)

Primary Examiner — Robert Bader
(74) Attorney, Agent, or Firm — Womble Bond Dickinson (US) LLP

(57) ABSTRACT

This disclosure teaches techniques, devices, and systems for automatically modifying a 3-Dimensional (3D) object model. The apparatus comprising a memory and a processing device coupled to the memory. The processor and the memory are configured to obtain an input 3D object model comprising an input 3D mesh, analyze the input 3D mesh to identify unprintable overhangs that have an angle over an overhang angle limit and identify vertices associated with the unprintable overhangs as active vertices, and perform an optimization process to move the active vertices to eliminate the unprintable overhangs and generate a modified 3D mesh. The optimization process includes a gradient descent search algorithm performed on an objective function comprising a cost function configured to minimize a difference between the input 3D mesh and the modified 3D mesh subject to an overhang constraint related to the overhang angle limit.

24 Claims, 10 Drawing Sheets

(56) References Cited

OTHER PUBLICATIONS

Helmut Pottmann, Caigui Jiang, Mathias Hobinger, Jun Wang, Philippe Bompas, Johannes Wallner, "Cell packing structures", Mar. 2015, Elsevier, Computer-Aided Design, vol. 60, pp. 70-83.*

Yaguang Wang, Jincheng Gao, Zhan Kang, "Level set-based topology optimization with overhang constraint: Towards support-free additive manufacturing", Sep. 1, 2018, Elsevier, Computer Methods in Applied Mechanics and Engineering, vol. 339, pp. 592-614.*

Zaiqiang Wu, Wei Jiang, Hao Luo, Lin Cheng, "A Novel Self-Intersection Penalty Term for Statistical Body Shape Models and Its Applications in 3D Pose Estimation", Jan. 24, 2019, MDPI, Applied Sciences, 9(3), 400, pp. 1-17.*

Michael Yu Wang, Xiaoming Wang, Dongming Guo, "Structural Shape and Topology Optimization in a Level Set Based Implicit Moving Boundary Framework", Aug. 2, 2002, preprint submitted to Structural and Multidisciplinary Optimization.*

* cited by examiner

SHAPE MODIFICATION FOR SELF-SUPPORTING STRUCTURES IN ADDITIVE MANUFACTURING

TECHNICAL FIELD

Implementations of the present disclosure relate to automatically modifying a 3D object model to eliminate overhangs and/or stalactites that are unprintable in additive manufacturing.

BACKGROUND

Usage of additive manufacturing (AM) generally, and 3D printing (3DP) specifically, for production of parts has increased dramatically in the decades since its inception. 3D printing technologies such as powder bed fusion, material extrusion, material jetting and binder jetting have significantly expanded what is manufacture-able. Notable examples of the benefits of AM can be found in soft robotics, the aviation industry, and bridge and house construction.

Parts to be manufactured by additive methods are constrained very differently than parts to be made by subtractive methods. AM allows for the manufacture of complicated internal geometries that are difficult or impossible to realize with standard subtractive methods, and most AM processes also induce an orientation-dependent constraint, that is, surfaces that overhang too much need to be supported or avoided.

Many forms of additive manufacturing make use of transforming matters from one state to another, such as from liquid to solid, by chemical reactions or by heat (e.g., melting materials at specific locations and solidifying when cooled). In common examples, plastic or metal particles (e.g., fine powder or liquid) may be applied in a thin layer on a work area to receive moving laser beams (or other energy source) that locally melt the particles through certain thicknesses to penetrate the current layer of powders and bond to the previous layer. The molten powders then solidify when the laser beams move away. After the laser beams complete a design pattern (e.g., a slice) in one layer, another layer of particles is laid on top. Layer by layer, complicated structures can thus be formed.

AM is not without constraints. For example, most AM methods share the problem of manufacturing parts with unsupported downward-facing surfaces. Specifically, in the case of 3D printing techniques such as powder bed fusion and certain material extrusion and material jetting methods, it is common to introduce sacrificial structure, structure not needed for part function, to support physical and/or thermal loads. For almost any 3D printing process, "islands" of material that occur when slicing must be supported by added structure, sacrificial or otherwise. In the case of powder bed fusion, sacrificial structure may be used to mitigate thermal gradients that could otherwise cause residual stresses and lead to cracking, curling, de-lamination and shrinkage.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

Like numerals indicate like elements.

DETAILED DESCRIPTION

The present disclosure provides various techniques for automatically generating a "near-net" shape of an object model to generate a self-supporting structure. Additive manufacturing (AM) represents a class of advanced manufacturing technologies to fabricate geometrically complex, high-performance functional parts. AM processes often produce what is referred to as a "near-net" shape, which represents the intended design and added sacrificial support structures to be removed in post-processing. The amount of extra material in the near-net shape directly increases fabrication cost and clean-up time. The present disclosure describes a shape modification method for AM parts to minimize the need for sacrificial material in the near-net shape.

Embodiments of the present techniques describe a geometry modification algorithm that can modify an existing 3D object model to eliminate overhangs that cannot be 3D printed without added support structures. Rather than add support scaffolding that would need to be removed, the techniques can modify the shape of the 3D object to make it self-supporting. The techniques described herein helps to ensure that the shape modifications to the original object are minimized while maintaining topological validity (i.e., manifoldness) and eliminating overhangs greater than a specified limit.

The optimization algorithm may be configured as a gradient descent algorithm. The gradient descent algorithm involves minimizing an objective function that includes a cost related to vertex motion and a regularization term that helps to ensure that the optimized shape is valid and suitable for AM. The regularization term may be a pseudo-energy regularization term that uses a linear springs model or a sphere packing model, for example. Differentiable expressions of the objective function and constraints may be generated and used to compute efficient gradient based optimization.

The techniques described herein enable modification of the net-shape of a part given as a boundary-represented mesh to reduce the need for sacrificial support structure and reduce issues caused by length-scale constraints, while also minimizing the volumetric difference between the input 3D object model and the output 3D object model. The modification of the 3D model is subject to the constraints that the part remains watertight, if it started so, and preserves other figures-of-merit representing surface integrity and volume-integrity. Additionally, the techniques described herein ensure that the input object model is a geometric subset of the output object model in case the some or all of the added material is to be removed in a post processing subtractive manufacturing step. The described techniques facilitate this by allowing modifications to only be additions to the input object model.

Figure 1:
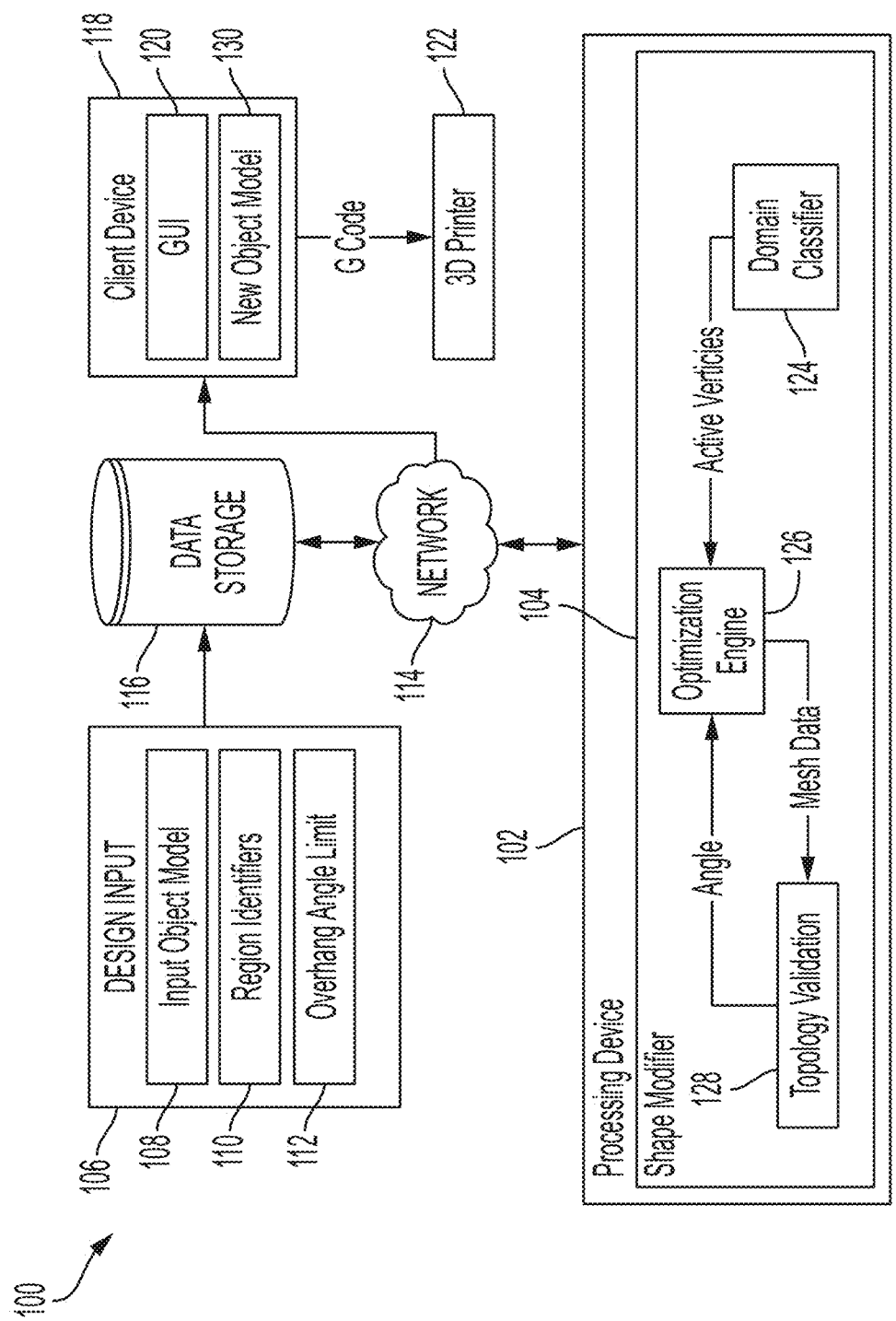
FIG. 1 is a block diagram of an automatic shape modification system 100, in accordance with some embodiments of the present disclosure.

FIG. 1 is a block diagram of an automatic shape modification system 100, in accordance with some embodiments of the present disclosure. The system 100 includes a processing device 102 with a shape modifier 104 configured to perform a modification algorithm that modifies an input object model 108 to eliminated overhangs that exceed a specified threshold.

The modification algorithm may be performed based, at least in part, on design input 106, which may include the input object model 108, region identifiers 110, and an overhang angle limit 112. Some or all of the design input 108 may be received from a user over a network 114 and stored to a data storage device 116. For example, design input 106 may be received from the client device 118, which can include a graphical user interface (GUI) 120 for providing the design input 106. The client device 118 may also be coupled to a 3D printer 122, which may be used to eventually print the 3D object represented by the input object model 108.

The input object model 108 describes the original 3D object to be printed and may be generated by or otherwise provided by the user. The input object model 108 may be any a computer-aided design (CAD) model (e.g., in AutoCAD™, Solidworks™, STEP, VRML, IGES, or DXF formats), or point cloud models (e.g., .obj, .x3d, files and the like), or files that can be converted to such files (e.g., .png image files with user-defined thickness information). The only constraint on the CAD model is that the sub-surfaces of the model that are to be modified are manifolds representable as federated piecewise linear polygonal patches. The input object model 108 may be uploaded to the system 100 by the user via the client device 118.

The region identifiers 110 can be used to describe the intent or objectives of the user. For example, the region identifiers 110 can specify features (surfaces, volumes, etc.) of the 3D object as having special attributes that relate to the 3D object's ultimate use. For example, the region identifiers 110 may specify a surface of the 3D object as having a shape that is modifiable or not modifiable. A modifiable surface may be one wherein the surface can be changed within a range of values without altering the function of the 3D object. A surface that is not modifiable may be one that the user expects to engage with a feature of another 3D object, for example.

The angle overhang limit 112 describes the steepest angle that can be printed by a designated 3D printer, such as the 3D printer 122. The overhang angle limit 112 may be specified by the user or may be determined, for example, based on the type of 3D printing technology in use.

The shape modifier 104 may include a domain classifier 124, an optimization engine 126, and topology validation tool 128. In some embodiments, the input object model 108 may be analyzed by the domain classifier 124 to identify volumes or surfaces of the 3D object that are to be modified. The vertices associated with surfaces that are to be modified may be flagged as active vertices, which may be adjusted according to the modification algorithms described herein. For example, the domain classifier 124 may identify the vertices associated with overhanging faces or edges that exceed the overhang angle limit 112 as active vertices. Other portions of the 3D object that are self-supporting or have been identified by the user as non-modifiable according to the region identifiers 110 may not be subject to modification, other than possibly the addition scaffolding which will later be removed in the case of an unsupported overhanging surface.

The optimization engine 126 receives the active vertices and attempts to modify the positions of the active vertices so that the overhang limit is no longer exceeded. In some embodiments, the shape modification performed by the optimization engine 126 may be performed in incremental steps to ensure that the model topology remains valid. For example, the 3D model may be adjusted incrementally through successive iterations of the optimization engine 126 to gradually adjust the angle of the overhanging surface from the original angle to a final angle that is below the overhang angle limit 112. In each step, a suboptimization is solved under the increasingly strict overhang limit until the process converges to a valid near-net shape. In cases where there is a large discrepancy between the given design and feasible space, performing the optimization in a sequence of steps may prevent the optimizer from failing to converge or converging to an unsuitable local optimum.

After each iteration of the optimization engine 126, the mesh data for the current object model may be sent to the topology validation tool 128 to determine whether the topology is still valid and can be printed. In some cases, the modification of the object model 108 may cause different parts of the object to intersect, in which case, the object model would not be printable. Other reasons why the object model may become invalid would be that the shape is no longer a topological manifold, features are too small to be printed, and others.

The topology validation tool 128 determines whether the topology described by the mesh data is still valid and identifies a new optimization angle for the next iteration of the optimization engine. If the topology is still valid, the optimization angle may be incremented toward the final angle by a specified step size. If the topology is not valid, the optimization angle and the step size can both be reduced. The new angle is sent to the optimization engine 126 for the next iteration of the process. The optimization engine 126 may also revert back to a previous mesh, i.e., one of the previous object models that were topologically valid.

The metrics used by the optimizing engine 126 may be continuous functions, which are subject to be solved through gradient based computations. In some embodiments, the optimization engine 126 may be configured to minimize the volumetric difference between the input object model 108 and the new object model 130. This provides the user with a result that keeps increases in the material costs low and is most likely to engender trust by being close to what is expected. In other embodiments, the optimization engine 126 may be configured to minimize overall mass as a proxy for material cost without constraining the geometry to be close the input model. Additionally, the optimization engine 126 may be configured to ensure that any of the modifications to the input mesh are additions. This ensures that the input object model 108 is a geometric subset of the output object model 130 in case material is to be removed.

In some embodiments, the surface of the 3D object model 108 may be partitioned into multiple distinct areas. In such embodiments, the shape modifier 104 may be configured to modify each partition separately. This can improve computational efficiency via parallelization and better eventual results via granular application of constraints based on local functionality. Enforcing that the areas are distinct helps to avoid self-intersections and ensures the surface-integrity and volume-integrity of the result.

The shape modifier 104 may continue to modify the mesh until the angle of the overhanging surfaces are at the target angle, i.e., below the overhang angle limit 112. The result of the algorithm is the new object model 130, which may be stored to the data storage 116 or send over the network to the client device 118, for example. The new object model 130 may be selected by the user for printing and sent to the 3D printer 122. It will also be appreciated that additional processing may be required to transform the new object model 130 into a form used by a specific 3D printer. For example, a program referred to as a slicer may transform the file from a CAD or STL file to a G-code file.

In some cases, any of the unprintable overhangs may be eliminated by modifying the shape of the input object model 108 as described above to reduce the overhang angles. In some cases, support structure of the same material or a different material may be formed during the printing process to provide the support for some overhangs. For example, if an overhang is identified by the user as an unmodifiable region, the input object model 108 may be modified to create a print configuration that includes the 3D object plus the support structures, for example, pillars or fins. The support structures may be later removed through an SM manufacturing process.

Although the processing device 102 and the client device 118 are illustrated as two separate devices, in some cases, the processing device 102 and the client device 118 may be included in a same computational system (or two modules on a common computational platform). In some embodiments, the GUI 120 may be included as a component of the shape modifier 104. In some cases, the client device 118 may be a consumer terminal (e.g., a personal computer, a smart phone, etc.) that enables a user to upload designs and relevant information to the data storage 116, and the processing device 102 may behave as a server performing requested services to generate the new object model 130 and deliver the new object model 130 via the network 114. It will be appreciated that other computing system configurations may be used to implement the techniques described herein without deviating from the scope of the present disclosure.

Figure 2:
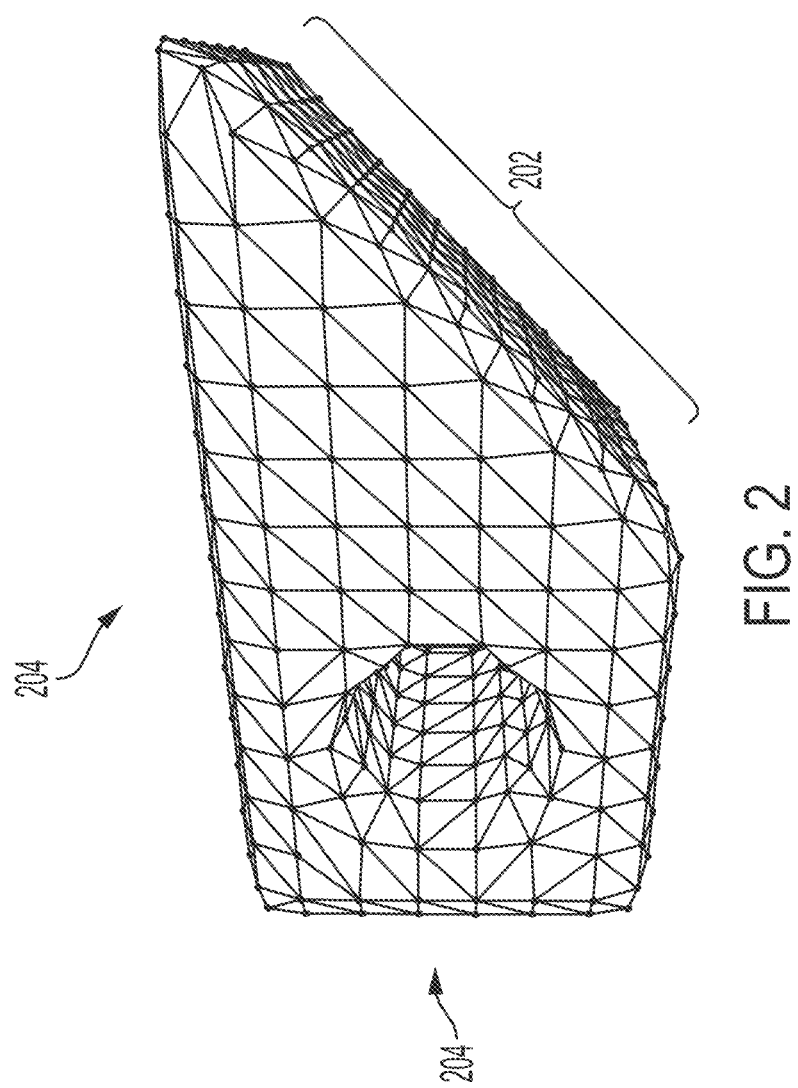
FIG. 2 is a perspective view of an example 3D object model, in accordance with some embodiments of the present disclosure.

FIG. 2 is a perspective view of an example 3D object model in accordance with some embodiments of the present disclosure. The object model may be the input object model 108 of FIG. 1. As shown in FIG. 2, the object model may be a triangular mesh. However, other mesh styles are also possible. The object model may be displayed by the GUI 120, which can also allow the user to select particular surfaces of the object model to set one or more region identifiers 110.

In the example shown in FIG. 2, the slanted surface 202 and the top surfaces of the hole 204 are overhanging surfaces with an overhang angle beyond the overhang angle limit. Each overhanging surface includes several triangular faces. The domain classifier 124 can analyze each triangle of the mesh to identify each face with an overhang angle beyond the limit. The vertices of these faces may be flagged as being active vertices, which may be modified during the optimization process. In addition to overhanging faces, the domain classifier may also identify overhanging edges, and overhanging points referred to herein as stalactites, as described further below.

The user may be able to select particular regions of the mesh as being non-modifiable. For example, it may be the case that the hole is designed to engage with another part. Accordingly, the user could select the surfaces of the hole as being non-modifiable. For those overhanging surfaces identified as non-modifiable, support scaffolding could be added rather than modifying the shape. Such support scaffolding may be preferred since it will likely be easier to remove in post-processing.

Figure 3:
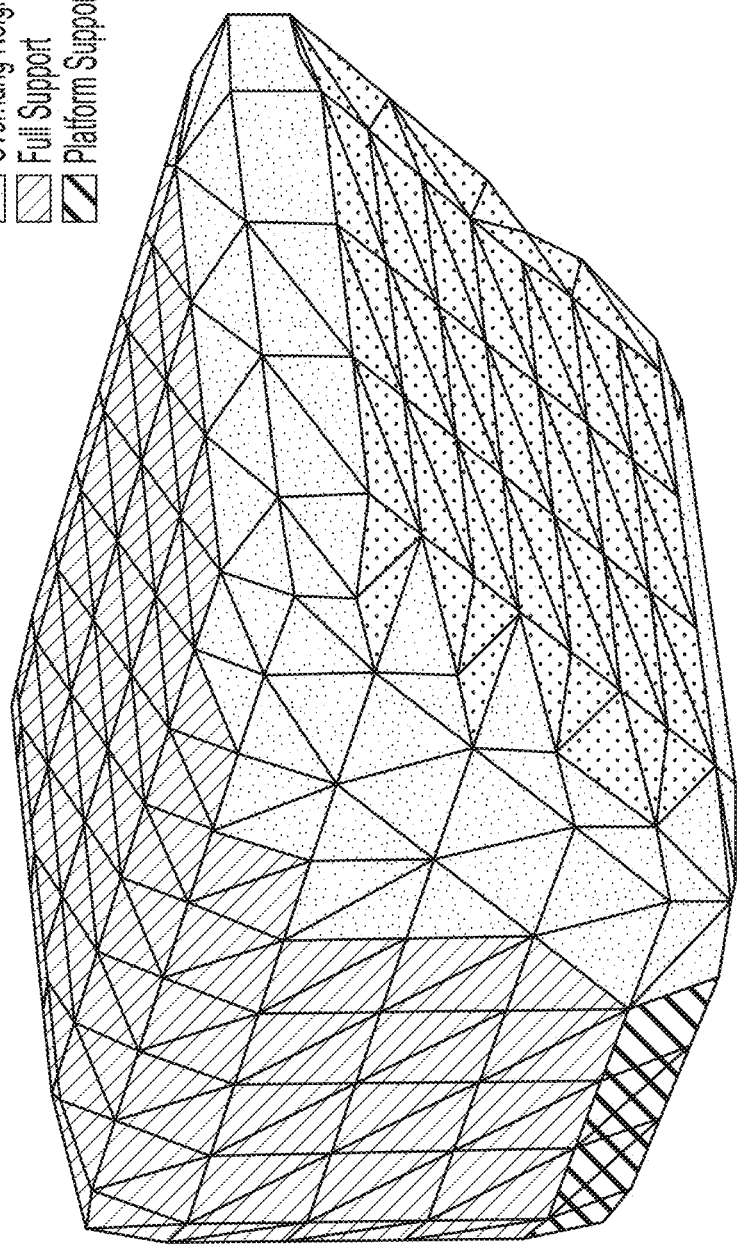
FIG. 3 illustrates an example domain classification based on overhang regions, in accordance with some embodiments of the present disclosure.

FIG. 3 illustrates an example domain classification based on overhang regions, in accordance with some embodiments of the present disclosure. FIG. 3 shows another example of an input object model that forms a triangular mesh. The mesh faces identified in FIG. 3 as "overhang" are regions of the object model that violate the overhang limit. The mesh faces identified in FIG. 3 as "overhang neighbor" are within the prescribed topological neighborhood distance of the overhang regions. The mesh faces identified as "platform support" are the regions supported directly by the build platform, which are not constrained by the overhang limit. The mesh faces identified as "full support" are regions that are fully supported and can be printed without being altered.

The active vertices in this example are the vertices belonging to the overhang or overhang neighbor regions. The design variables of the optimization can include the positions of active vertices. Other vertices are 'inactive', which meaning their positions would not be changed. An edge can be considered to be active, if at least one of its ends are active vertices. Similarly, a face is called active, if at least one of its three nodes is active. Only active vertices, edges, and faces are considered in the optimization. The inactive vertices play the role of boundary conditions in the optimization. In the following description of the optimization process, any reference to vertices, edges, or faces, will be understood to be referring to the active vertices, edges, and faces.

As described further below, the optimization process may use a gradient descent algorithm to minimize an objective function. The following description of the optimization process operates on a surface triangle mesh T, which includes an associating vertex set V, edge set E, and face set F. The number of vertices is referred to as $n_v$, the number of edges is referred to as $n_e$, and the number of faces is referred to as $n_f$. For each vertex index $u=1, 2, \ldots, n_v$, the position of the vertex is denoted as $p_u := [x_u, y_u, z_u]^T \in V$. The design variables are the coordinates of the vertices denoted by $x := [x_1, y_1, z_1, \ldots, x_{n_v}, y_{n_v}, z_{n_v}]$.

Two vertices u and v are linked by an edge e if $e=(u, v) \in E$. The direction of the edges are distinguished. Three vertices u, v, and w form a triangle f if $f=(u, v, w) \in F$. The vertices of a face may be ordered counter-clock wise, which reflects the orientation of the surface. The set of vertices that share an edge with u are denoted as $V_u$, called the set of neighbors of u. The set of edges that have u as one of their ends are denoted as $E_u$. The set of faces that have u as one of its nodes are denoted as $F_u$.

The optimization process performed by the optimization engine 126 uses an objective function, which can include a cost function and a regularization term. The cost function is expressed as a vertex motion that describes the changes made on the original design (object model 108) as the overall motions of vertices. For a vertex u, its original position is denoted as $P_u^{(0)}:32\ [x_u^{(0)},\ y_u^{(0)},\ z_u^{(0)}]^T$. The vertex motion function can be expressed the distance from the original position:

$$f_{change}(X) = \Sigma_{u \in V}[(x_u - x_u^{(0)})^2 + (y_u - y_u^{(0)})^2 + (z_u - z_u^{(0)})^2]/l_c^2 \qquad \text{Eq. (1)}$$

In equation (1), $l_c$ is a characteristic length of the mesh, which is used to normalize the motions of the vertex. In some embodiments, $l_c$ may be chosen as the mean over all the edges. The gradient of the vertex motion function is:

$$\nabla f_{change}(x) = \frac{2}{l_c^2}\left[(x_1 - x_1^{(0)}), (y_1 - y_1^{(0)}), (z_1 - z_1^{(0)}), \ldots\right]^T \qquad \text{Eq. (2)}$$

In some embodiments, the goal of the optimization performed by the optimization engine is to minimize the objective function subject to various constraints, which are described below. One of the constraints may be a face overhang constraint, which is describe below with reference to FIG. 4.

Figure 4:
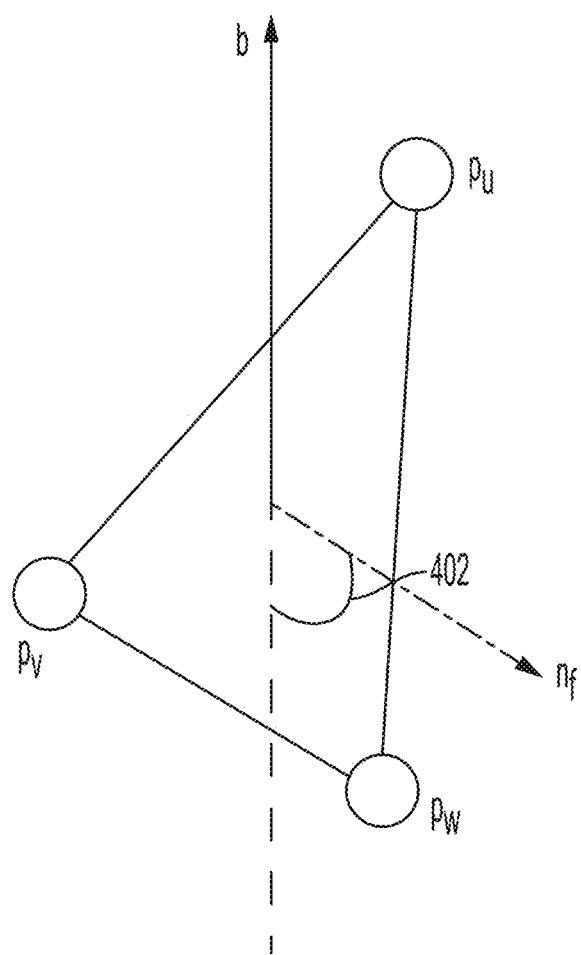
FIG. 4 is a plot of an example face in a triangular mesh object model, in accordance with some embodiments of the present disclosure.

FIG. 4 is a plot of an example face in a triangular mesh object model, in accordance with some embodiments of the present disclosure. For a given face $f_i = (u, v, w) \in F$, the overhang angle 402 is defined as the angle between its normal vector, $n_{f_i}$ and building direction b, where the build direction vector is, at least usually, the normal of the build plate that points in the direction that material is added. The normal vector is calculated by the positions of its three vertices as:

$$n_{f_i} = (p_v - p_u) \times (p_w - p_u) = \begin{bmatrix} (y_v - y_u)(z_w - z_u) - (z_v - z_u)(y_w - y_u) \\ (z_v - z_u)(x_w - x_u) - (x_v - x_u)(z_w - z_u) \\ (x_v - x_u)(y_w - y_u) - (y_v - y_u)(x_w - x_u) \end{bmatrix} \text{Eq. 3}$$

The face overhang constraints, denoted as $h = \{h_i\}$, may be formulated as:

$$h_i = \frac{n_{f_i} \cdot b}{\|n_{f_i}\|} + \cos(\alpha) \geq 0, \forall f_i \in F \qquad \text{Eq. 4}$$

In equation 4, $\alpha$ is the optimization angle, which may be the prescribed overhang angle limit 112 or, in some embodiments, an intermediate angle used for a suboptimization as explained further below. The constraints can also include point overhang constraints, as described below in relation to FIG. 5.

Figure 5:
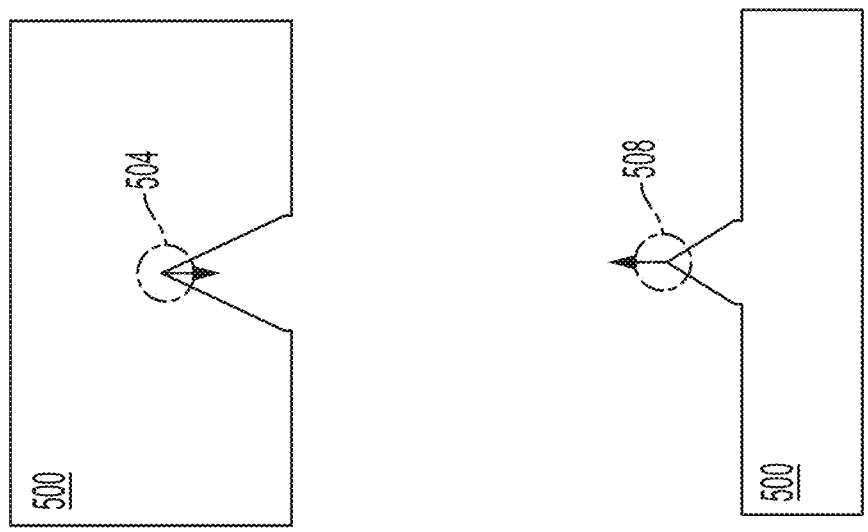
FIG. 5 illustrates different types of extremum points in an AM part, in accordance with some embodiments of the present disclosure.
Figure 5:
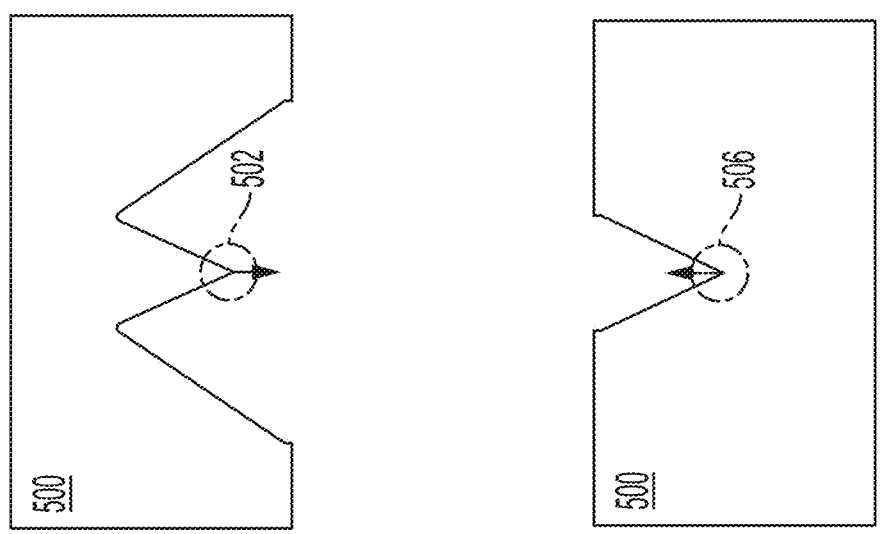

FIG. 5 illustrates different types of extremum points in an AM part 500, in accordance with some embodiments of the present disclosure. The circled point 502 is a point overhang region and is not printable. By contrast, the circled points 504, 506, and 508 are printable. As shown in FIG. 5, the normal vectors of points 502 and 504 both face down, while the normal vectors of points 506 and 508 face up. Further, the overhanging point 502 is at the local minimum of height function, while the overhanging point 504 is at the local maximum of height function. Thus, point 502 can be distinguished from all other cases.

It is noted that all the faces shown in FIG. 5 all satisfy the overhang constraints as stated in Equation (4), even though there are extremum points with no supporting material below them. Since the face overhang constraint only considers the normal vector of each face, there may be cases where the overhang point (denoted u) is at a local minimum and forms an unprintable stalactite even though its adjacent faces $F_u$ satisfy Equation (4). This type of over-hang vertex may be referred to as a "stalactite" and is denoted as $V_{stalactite}$. For a vertex u, its corresponding normal vector $n_u$ can be defined as:

$$n_u := \frac{1}{|F_u|} \sum_{f \in F_u} \frac{n_f}{\|n_f\|} \qquad \text{Eq. (5)}$$

As illustrated by FIG. 5, $V_{stalactite}$ is the set of the vertices at the local minimum of height function whose normal vectors are directed downward relative to the build direction b. These two coupled conditions can be used to distinguish $V_{stalactite}$ from the other vertices in V. In some embodiments, instead of formulating a compound constraint that combines the two conditions, the constraint can be decoupled into two conditions. First, the set of the downward facing vertices, denoted as $V_{face\_down}$, can be searched based on the vertex normal vectors. This may be expressed as:

$$V_{face\_down} := \left\{ u \in V \left| \frac{n_u \cdot b}{\|n_u\|} \leq \gamma \right. \right\} \qquad \text{Eq. (6)}$$

In equation 6, $\gamma$ is a negative number larger than $-1$, often, but not necessarily, defined as $-\cos(\alpha)$. Next, the point overhang constraints k defined in Equation (7) below are applied to ensure that any vertex $V_{face\_down}$ is not a local minimum, in the z direction, among its neighbors.

$$k_i = z_{u_i} - \min_{v \in V_{u_i}} z_v > 0, \forall u_i \in V_{face\_down} \qquad \text{Eq. (7)}$$

The constraints can also include edge overhang constraints, as described below in relation to FIG. 6.

Figure 6:
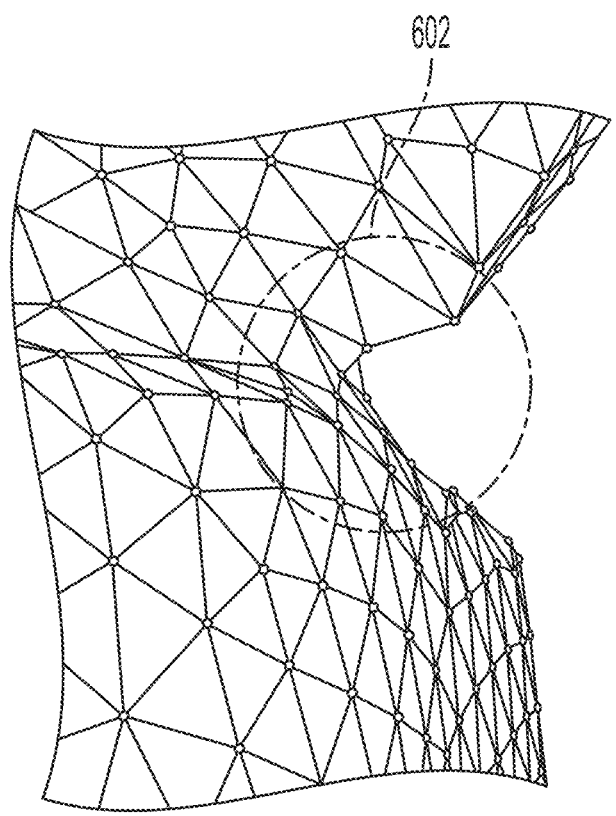
FIG. 6 shows a portion of a mesh that illustrates an edge overhang, in accordance with some embodiments of the present disclosure.

FIG. 6 shows a portion of a mesh that illustrates an edge overhang 602, in accordance with some embodiments of the present disclosure. In FIG. 6, the edge is almost horizontal and is therefore not self-supporting. However, the angles of adjacent faces do not exceed the overhang angle limit and none of the adjacent vertices is a stalactite. Accordingly, this type of overhanging edge would not be addressed by the constraints expressed in Equations 4 and 7. In some embodiments, the edge slopes may be included in the point overhang constraints to avoid overhanging edges. Modifying the point overhang constraints k defined in Equation (7) to incorporate edge slopes yields the following:

$$k_i = \max_{v \in V_{u_i}} \frac{z_{u_i} - z_v}{\|p_{u_i} - p_v\|} - \sin(\alpha) > 0, \forall u_i \in V_{face\_down} \qquad \text{Eq. (8)}$$

To ensure differentiability, a smooth function can be used to approximate the max from Eq. 8. The constraint functions are approximated as:

$$\hat{k}_i = S_\beta(u_i) > 0, \forall\, u_i \in V_{face\_down}, \quad \text{Eq. (9)}$$

$$S_\beta(u_i) = \frac{\sum_{v \in V_{u_i}} \zeta_v e^{\beta \zeta_v}}{\sum_{v \in V_{u_i}} e^{\beta \zeta_v}},$$

$$\zeta_v = \frac{z_{u_i} - z_v}{\|p_{u_i} - p_v\|}$$

In the above equations, $\beta$ is a positive scalar value and as $\beta \to \infty$, Equation (9) converges to Equation (8) or $\hat{k} \to k$. The gradient of $k_i$ against the position coordinates of $u_i \in V_{face\_down}$ is:

$$\nabla_{u_i} \hat{k}_i = \sum_{v \in V_{u_i}} \begin{bmatrix} \frac{\partial S_\beta(u_i)}{\partial \zeta_v} \frac{\partial \zeta_v}{\partial x_{u_i}} \\ \frac{\partial S_\beta(u_i)}{\partial \zeta_v} \frac{\partial \zeta_v}{\partial y_{u_i}} \\ \frac{\partial S_\beta(u_i)}{\partial \zeta_v} \frac{\partial \zeta_v}{\partial z_{u_i}} \end{bmatrix} \quad \text{Eq. (10)}$$

For a vertex $v \in V_{u_i}$, the gradient is:

$$\nabla_v \hat{\zeta}_i = \begin{bmatrix} \frac{\partial S_\beta(u_i)}{\partial \zeta_v} \frac{\partial \zeta_v}{\partial x_v} \\ \frac{\partial S_\beta(u_i)}{\partial \zeta_v} \frac{\partial \zeta_v}{\partial y_v} \\ \frac{\partial S_\beta(u_i)}{\partial \zeta_v} \frac{\partial \zeta_v}{\partial z_v} \end{bmatrix} \quad \text{Eq. (11)}$$

The constraints may also include "outward" constraints that ensure that the vertices only move outward from the surface of the as-designed object. In many practical applications, the design (or some regions of the design) must remain unchanged due to functional or assembly requirements. In these cases, the intended design (or at least the regions of interest) must be contained in the self-supporting near-net shape produced by the AM process. The sacrificial support structures can be subsequently removed by machining, for example. Thus, the embodiments of the present techniques are to optimize the near-net shape by locally controlling the self-supporting features. In other words, the supports may be generated by enforcing the constraint that the vertices on the specific regions move along an outward direction of the original surface.

The set of vertices that can only go outward may be denoted as $V_{outward}$. The outward constraints, denoted as m, may be formulated as:

$$m_i = (p_{u_i} - p_{u_i}^{(0)}) \cdot n_{u_i}^{(0)} > 0, \forall u_i \in V_{outward} \quad \text{Eq. (12)}$$

The constraint expressed above restricts the moving direction of a vertex from its original position to an angle less than $\pi/2$ from its original local normal vector of the surface, which means it can only move to the outward of the original surface. The gradient of $m_i$ against the position coordinates and radius of $u_i \in V_{outward}$ is:

$$\nabla_{u_i} m_i = n_{u_i} \quad \text{Eq. (13)}$$

As seen from equation 13, the gradient of the outward constraint is equal to the vertex normal vector in the previous step.

Figure 7:
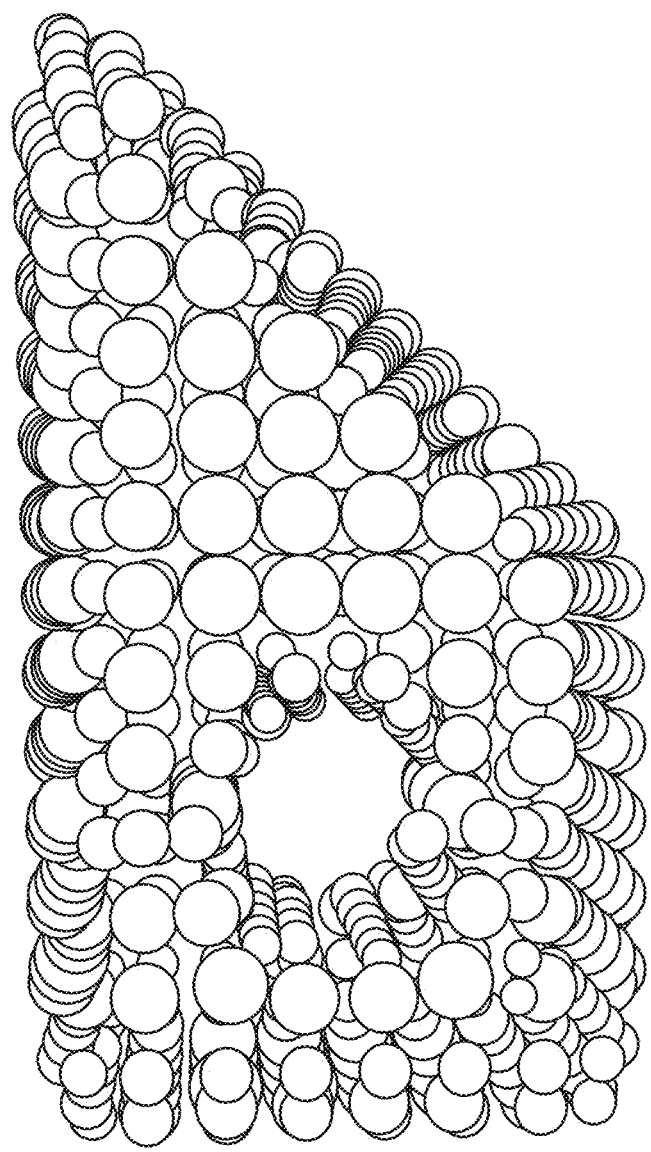
FIG. 7 is a perspective view of an example 3D object model, in accordance with some embodiments of the present disclosure.

FIG. 7 is a perspective view of an example 3D object model, in accordance with some embodiments of the present disclosure. The object model may be the input object model 108 of FIG. 1. The object model of FIG. 7 may be modeling the same object as the object model of FIG. 2. However, in FIG. 7 the vertices are replaced by spheres to illustrate a sphere packing technique for maintaining mesh quality.

As stated above, the objective function for the optimization process may include a cost function and a regularization term. The regularization term may be used to ensure the quality of the mesh. Modifying triangulated surface meshes by moving vertices can result in low quality, degenerate, or self-intersecting triangles that render the entire design topologically invalid. For example, the movement of vertices could cause two triangles of the mesh to intersect one another, resulting in a non-manifold surface where "inside" and "outside" lose meaning, and thus that cannot be printed. Self-intersecting surfaces or other factors that render the mesh topologically invalid or otherwise unprintable may be referred to as mesh deformations.

The regularization term may be a pseudo-energy that is used to maintain quality of the mesh. Adding the regularization term to the vertex-motion cost function of equation 1 results in the following objective function:

$$f(x) = \sum_{u \in V} [(x_u - x_u^{(0)})^2 + (y_u - y_u^{(0)})^2 + (z_u - z_u^{(0)})^2]/l_c^2 + E(V, E) \quad \text{Eq. (14)}$$

In the above equation, the regularization term E (V, E) is the pseudo-energy defined on edges. The regularization term E (V, E) would be minimized if the angle distortions are uniformly distributed over the mesh, which preserves the mesh quality.

In some embodiments, the pseudo-energy may be defined by modeling the edges as linear springs. In such embodiments, the optimal displacements for each vertex are found by minimizing the overall elastic energy of all the springs. The pseudo-energy of linear springs may be defined as:

$$E_{spring}(x) = \sum_{e \in E} \left( \frac{l_e - l_e^{(0)}}{l_e^{(0)}} \right)^2 \quad \text{Eq. (15)}$$

In the above equation, $l_e$ is the modified length of edge e, and $l_e^{(0)}$ is the initial length of e.

Alternatively, as shown in FIG. 7, the pseudo-energy may be defined by modeling the vertices of the mesh as spheres (sphere packing). Sphere packing is a form of discrete conformal mapping (DCM) which can be used in computational geometry to scale and rotate a shape while approximately preserving the angles and other distortion measures such as edge length ratio. Some DCM methods such as Dirichlet energy minimization or Least Square Conformal Maps (LSCM) require the initial and final configurations to be known a priori. These DCM methods are not suitable for the optimization process described herein since the final shape is not known beforehand.

Sphere packing is a form of DCM that does not require the final shape to be known beforehand. In sphere packing, two triangle meshes are discrete conformal equivalents if certain properties are preserved between the mesh no matter how coarse the meshes are. For example, a mapping between two triangle meshes are discrete conformal equivalents if the length cross ratios are preserved. Circle packings define a kind of discrete conformal mapping that preserves circles, originating from the observation that smooth conformal maps preserve infinitesimal circles. A circle packing is a configuration of disjoint circles with a pattern of tangency that is a graph that shares the same topology as a prescribed triangulation of the surface. The circles, defined by the geodesic distance on the embodying surface, reveal the geometric information.

In accordance with embodiments, sphere packing is used to parameterize and modify 3D surface meshes to generate optimized self-supporting near-net shapes. A sphere packing S, consisting of a set of spheres $\{s_1, s_2, \ldots\}$, can be built from a triangle mesh by placing spheres at all the vertices of the mesh. The indices of the spheres are the same as the indices of the vertices. The center positions of the spheres are the same as the positions of the vertices. The center position of a sphere $s_i$ may be denoted as $c_i := [x_i, y_i, z_i]^T$ and its radius as $r_i$. The design variable can be expanded by including the radii of the spheres as:

$$x := [x_1, y_1, z_1, \gamma_1, \ldots, x_{n_v}, y_{n_v}, z_{n_v}, \gamma_{n_v}]^T$$

The pseudo-energy based on sphere packing can be expressed as:

$$E_{sphere}(x) = \sum_{e(u,v) \in E} \left( \frac{l_e - r_u - r_v}{l_e^{(0)}} \right)^2 \qquad \text{Eq. (16)}$$

By construction, the pseudo-energy of one edge is zero if the spheres located at its two endpoints are tangent.

The center of each sphere is initially located at its corresponding vertex position. The initial radius is prescribed as half-length of the shortest adjacent edge. The initial conditions can be mathematically expressed as follows:

$$c_u^{(0)} = p_u^{(0)}, \qquad \text{Eq. (17)}$$

$$r_u^{(0)} = \frac{1}{2} \min_{v \in V_u} \| P_u^{(0)} - P_v^{(0)} \|, \forall u \in V$$

This initial condition ensures that no pair of spheres overlap, but it might not satisfy the tangent constraint in all cases.

In some embodiments, local sensitivity analysis may be used to find the gradient of the objective function. In embodiments in which sphere packing is used for the regularization term, the objective function at each step of the optimization process may be expressed as:

$$f(x^{(t)}) = \Sigma_{u \in V} \| c_u^{(t)} - c_u^{(0)} \|^2 + w \Sigma_{e \in E} (g_e^{(t)})^2 \qquad \text{Eq. (18)}$$

In the above equation, the norm squared is defined as $\|a\|^2$ given by $a^T a$ and w is a weight coefficient. The first part of the objective function accounts for the overall difference between the current shape of the object at step t and the initial shape. The second part mirrors the tangent constraint which is:

$$g_e^{(t)}(s_u, s_v) = \| c_u^{(t)} - c_v^{(t)} \| - (r_u^{(t)} + r_v^{(t)}) \equiv 0, \forall e = (u,v) \in E \qquad \text{Eq. (19)}$$

The gradient of the objective function is the sum of the gradient of the two parts, which may be expressed as follows:

$$\nabla f^{(t)} = \nabla(\Sigma_{u \in V} \| c_u^{(t)} - c_u^{(0)} \|^2) + w \nabla(\Sigma_{e \in E}(g_e^{(t)})^2) \qquad \text{Eq. (20)}$$

The part of the gradient that involves the position and radius of sphere $s_u$ is denoted as $\nabla_u$. The derivatives of the first part with respect to $x_u$, $y_u$, $z_u$, and $r_u$ are:

$$\nabla_u \left( \sum_{\forall u \in V} \| c_u - c_u^{(0)} \|^2 \right) = \nabla_u \left( \| c_u^{(t)} - c_u^{(0)} \|^2 \right) = 2 \begin{bmatrix} (x_u^{(t)} - x_u^{(0)}) \\ (y_u^{(t)} - y_u^{(0)}) \\ (z_y^{(t)} - z_u^{(0)}) \\ 0 \end{bmatrix} \qquad \text{Eq. (21)}$$

The derivatives of the second part with respect to $x_u^{(t)}$, $y_u^{(t)}$, $z_u^{(t)}$, and $r_u^{(t)}$ are:

$$\nabla_u \left( \sum_{e \in E} (g_e^{(t)})^2 \right) = \nabla_u \left( \sum_{e=(u,v) \in E_u} (g_e^{(t)}(s_u, s_v))^2 \right) \qquad \text{Eq. (22)}$$

$$= 2 \sum_{e=(u,v) \in E_u} g_e^{(t)}(s_u, s_v)(\nabla_u g_e^{(t)}(s_u, s_v))$$

For the tangent packing constraint, the term $\nabla_u g_e^{(t)}(s_u, s_v)$ from equation 22 may be expressed as:

$$\nabla_u g_e^{(t)}(s_u, s_v) = \left[ \frac{\partial g_e^{(t)}}{\partial x_u^{(t)}}, \frac{\partial g_e^{(t)}}{\partial y_u^{(t)}}, \frac{\partial g_e^{(t)}}{\partial z_u^{(t)}}, \frac{\partial g_e^{(t)}}{\partial r_u^{(t)}} \right] \qquad \text{Eq. (23)}$$

$$= \left[ \frac{x_u^{(t)} - x_v^{(t)}}{\| c_u^{(t)} - c_v^{(t)} \|}, \frac{y_u^{(t)} - y_v^{(t)}}{\| c_u^{(t)} - c_v^{(t)} \|}, \frac{z_u^{(t)} - z_v^{(t)}}{\| c_u^{(t)} - c_v^{(t)} \|}, -1 \right]^T$$

Similarly, the edge set may be denoted as $E := \{e_1, e_2, \ldots, e_{n_e}\}$ and the packing constraints may be expressed as:

$$g = \begin{bmatrix} g_{e1} \\ \vdots \\ g_{e_{ne}} \end{bmatrix} \equiv 0 \qquad \text{Eq. (24)}$$

The Jacobian matrix of g, with $n_e \times 4n_v$ dimensions, may be defined as:

$$J_g := \begin{bmatrix} \frac{\partial g_{e1}}{\partial x_1} & \frac{\partial g_{e1}}{\partial y_1} & \frac{\partial g_{e1}}{\partial z_1} & \frac{\partial g_{e1}}{\partial r_1} & \cdots & \frac{\partial g_{e1}}{\partial x_{n_v}} & \frac{\partial g_{e1}}{\partial y_{n_v}} & \frac{\partial g_{e1}}{\partial z_{n_v}} & \frac{\partial g_{e1}}{\partial r_{n_v}} \\ \vdots & \vdots & \vdots & \vdots & \ddots & \vdots & \vdots & \vdots & \vdots \\ \frac{(\partial g_{e_{ne}})}{(\partial x_1)} & \frac{(\partial g_{e_{ne}})}{(\partial y_1)} & \frac{(\partial g_{e_{ne}})}{(\partial z_1)} & \frac{(\partial g_{e_{ne}})}{(\partial r_1)} & \cdots & \frac{\partial g_{e_{ne}}}{\partial x_{n_v}} & \frac{\partial g_{e_{ne}}}{\partial y_{n_v}} & \frac{\partial g_{e_{ne}}}{\partial z_{n_v}} & \frac{\partial g_{e_{ne}}}{\partial r_{n_v}} \end{bmatrix} \qquad \text{Eq. (25)}$$

Note that $J_g$ is a sparse matrix. Each row only has eight non-zero values, which correspond to the two ends of an edge. Based on the above equations for $J_g$, equation (20) can be simplified as:

$$\nabla f = 2 \begin{bmatrix} x_1 - x_1^{(0)} \\ y_1 - y_1^{(0)} \\ z_1 - z_1^{(0)} \\ 0 \\ \vdots \\ x_{n_v} - x_{n_v}^{(0)} \\ y_{n_v} - y_{n_v}^{(0)} \\ z_{n_v} - z_{n_v}^{(0)} \\ 0 \end{bmatrix} + 2(g^T J_g)^T \qquad \text{Eq. (26)}$$

Once the gradient of the objective function is solved, the optimization algorithm can compute the next set of values for the active vertices.

The above formulas work well if the object model is simple or is there is a large amount of processing resources available. However, in some cases, the constrained optimization techniques described above may not converge in a reasonable time given real-world object models or limited processing resources of a standard desktop computer. In some embodiments, the computation complexity may be reduced to provide faster convergence times by relaxing the constraints from the strong forms described above to weak forms. The weak form constraints may be incorporated into the objective function, so that the optimization becomes unconstrained.

The weak form of the face overhang constraint, denoted as $f_{face}$, is defined as the sum of Heaviside function. The weak form of the face overhang constraint may be expressed as:

$$f_{face}(x, \lambda) = \sum_{f_i \in F} e^{-\xi i} \frac{1}{1 + e^{2\lambda \xi_i}}, \; \xi i = \frac{n_{fi} \cdot b}{\|n_{fi}\|} + \cos(\alpha) \qquad \text{Eq. (27)}$$

In a similar way, the weak form of point overhang constraint $f_{point}$ may be defined as:

$$f_{point}(x, \lambda) = \sum_{u_i \in V_{face\_down}} e^{-8\hat{k}_i} \frac{1}{1 + e^{2\lambda \hat{k}_i}} \qquad \text{Eq. (28)}$$

In the above equation, $\hat{k}_i$ is the point overhang constraint defined in Equation 9. Incorporating the face overhang constraint and the point overhang constraint into the objective function yields:

$$f(x) = f_{change}(x) + E(x) + w(f_{face}(x,\lambda) + f_{point}(x,\lambda)) \qquad \text{Eq. (29)}$$

During the optimization, w and λ can be gradually increased. To further reduce the complexity of the algorithm, some constraints may be left out of the algorithm. For example, the outward constraint may be not included.

Figure 8:
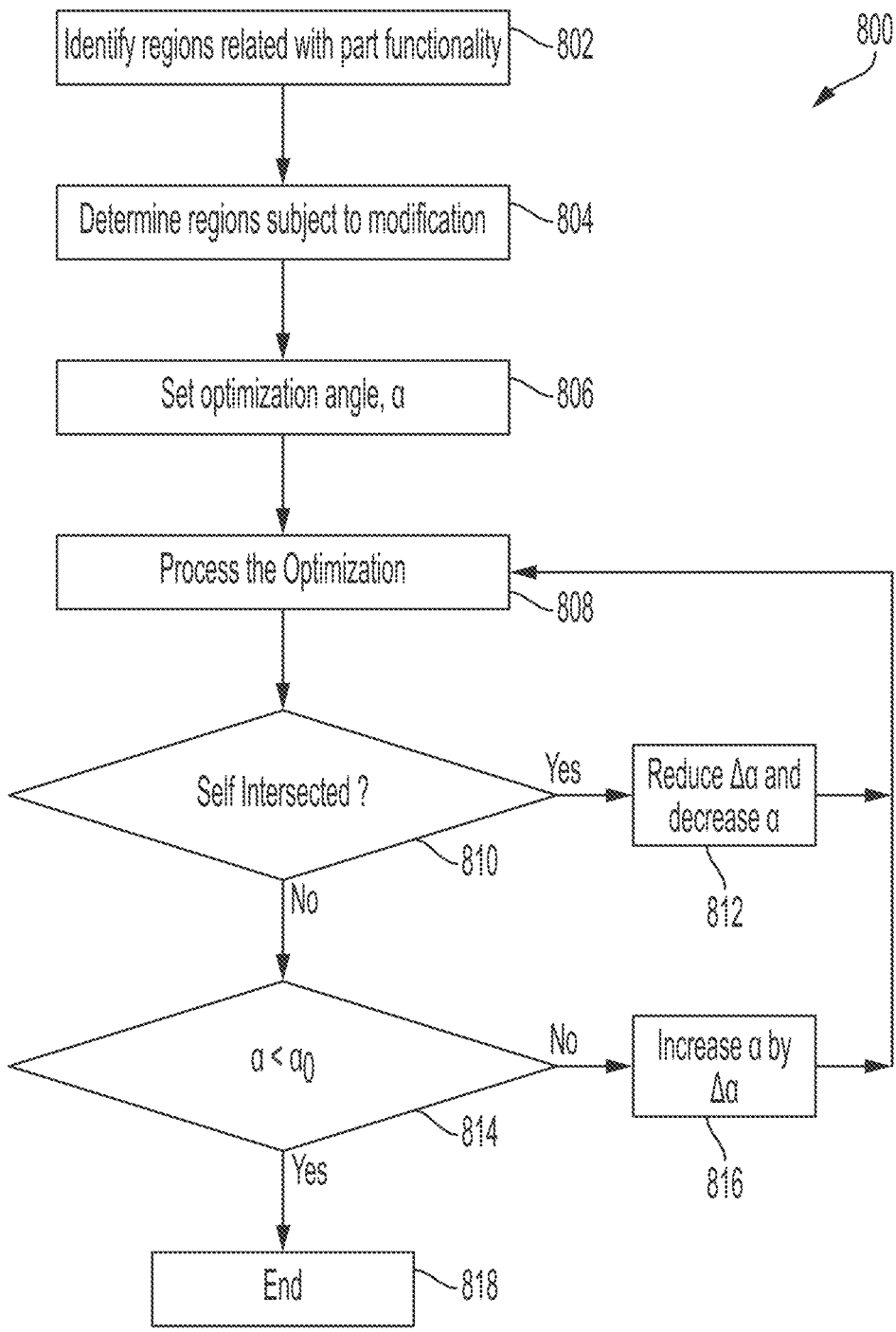
FIG. 8 is a process flow diagram for a method of modifying a 3D object model to eliminate overhangs, in accordance with some embodiments of the present disclosure.

FIG. 8 is a process flow diagram for a method 800 of automatically modifying a 3D object model to eliminate overhangs, in accordance with some embodiments of the present disclosure. The method may be performed by hardware or a combination of hardware and software. For example, the method 800 may be performed on the input object model 108 by the shape modifier 104 as described with reference to FIG. 1.

In some embodiments, the optimization process may be performed in a sequence of steps, referred to herein as suboptimizations, wherein the overhang constraint is adaptively tightened at each step. The angle to be achieved at each suboptimization may be referred to herein as the optimization angle, denoted α. The angle step, denoted Δα, refers to the change in the optimization angle between steps. The overhang angle limit 112 may be denoted $\alpha_0$. The angle step may be determined by dividing the overhang angle limit by the number of iterations to be performed.

At block 802, the user can specify regions as being non-modifiable. The identification of the non-modifiable regions can be stored as design input, e.g., the region identifiers 110 of FIG. 1. Regions specified as non-modifiable are not modified by the optimization algorithm.

At block 804, regions subject to modification are determined. Regions subject to modification include overhanging faces or edges with an overhang angle beyond the specified overhang angle limit 112 (FIG. 1). Regions subject to modification can also include extreme points such as stalactites (e.g., point 502 of FIG. 5). The vertices associated with these regions may be identified as active vertices, which are subject to change during the optimization process. The processed performed at block 804 may be performed by the domain classifier 124 of FIG. 1.

At block 806, the optimization angle is set to an initial value. In some embodiments, the initial value of the optimization angle may be equal to the angle step, Δα, or a multiple thereof.

At block 808, the optimization algorithm is performed using the current optimization angle. The process performed at block 808 may be referred to as a suboptimization and may be performed by the optimization engine 126 of FIG. 1. The optimization may be a gradient descent search in accordance with the techniques described above in relation to FIGS. 2-7 and equations 1-29. Gradient descent is an iterative optimization algorithm for finding a local minimum of a differentiable function. At each iteration, the derivative of the objective function is determined, which indicates the slope or gradient of the function based on the current positions of the mesh vertices. New mesh vertices can then be selected by multiplying the gradient by a specified step size. The optimization problem can be considered to converge upon a final solution when the gradient is below a specified threshold. The result of the process performed at block 808 is a new set of mesh data with some or all of the active vertices modified.

At block 810, the new mesh data is analyzed to determine if the object is self-intersected. Self-intersection occurs if any face of the mesh intersects any other face. The analysis of the mesh data may be performed by the topology validation tool 128 of FIG. 1. If the mesh is self-intersected, then the process advances to block 812.

At block 812, the optimization angle and the angle step are both reduced. This allows the optimization process to advance more gradually, which may have the effect of producing a valid mesh. In some embodiments, the angle step may be halved and the optimization may be reduced by an amount equal to the new angle step. Other adjustments are also possible. In addition to adjusting the optimization angle and angle step, the new mesh data may be discarded and the previous mesh data restored for use in the next step. The process flow then returns to block 808 and the optimization algorithm is performed using the new optimization angle and the starting mesh data from the previous cycle (discarding the new mesh data).

Returning to block 810, if the mesh is not self-intersected then the process advances from block 810 to block 814.

At block 814, if the optimization angle is beyond the overhang angle limit (i.e., not yet printable), then a further iteration of the optimization algorithm is performed, and the process flow advances to block 816.

At block 816, the optimization angle is increased by the optimization angle step. The process flow then returns to block 808 and the optimization algorithm is performed using the new optimization angle and the new mesh data generated by the previous suboptimization.

If, at block 814, the optimization angle is less than the overhang angle limit, this means that the suboptimization step converged to a solution with the current optimization angle set to the target angle. Thus, any overhangs exceeding the overhang angle limit have been eliminated from the mesh, and the process can end at block 818. The final mesh data may then be stored as the new object model 130 of FIG. 1.

It will be appreciated that embodiments of the method 800 may include additional blocks not shown in FIG. 8 and that some of the blocks shown in FIG. 8 may be omitted. Additionally, the processes associated with blocks 802 through 818 may be performed in a different order than what is shown in FIG. 8.

Figure 9A:
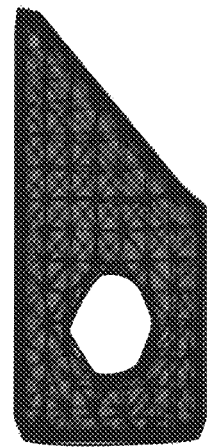
FIGS. 9A-9F illustrate intermediate results of topology optimization on the specific example 3D object model shown in FIG. 2, in accordance with some embodiments of the present disclosure.
Figure 9B:
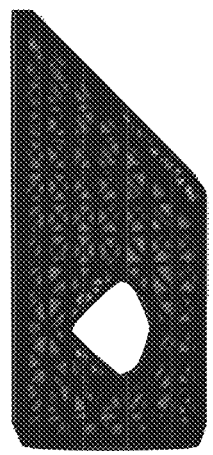
Figure 9C:
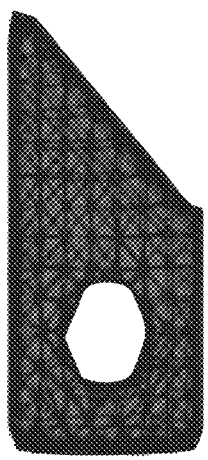
Figure 9D:
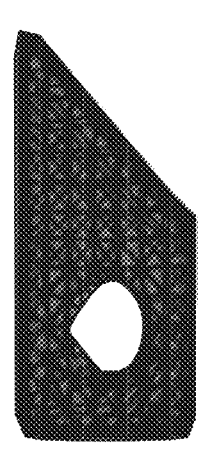
Figure 9E:
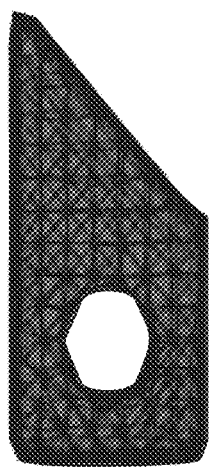
Figure 9F:
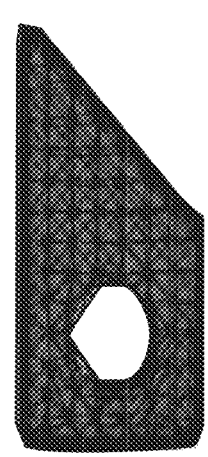

FIGS. 9A-9F illustrate a series of example sub-results of optimization on the example 3D object model shown in FIG. 2, in accordance with some embodiments of the present disclosure. FIGS. 9A-9E show the resulting mesh for a series of suboptimizations leading from the initial object model to the new object model, and FIG. 9F shows the final mesh for the new object model after the optimization.

In this example, sphere packing was used for mesh regularization. Additionally, $\gamma$ in Equation 6 is set to a value of $\cos(5\pi/6)$, and $\beta$ in Equation 9 is set to a value of 10, and the overhang angle limit was set to a value of 50 degrees.

The overall optimization was divided into series of suboptimizations as described in relation to FIG. 8. In the example shown in FIG. 9, $\Delta\alpha$ was set to 5 degrees, and the initial optimization angle was 25 degrees, which was gradually increased to 50 degrees. Thus, FIG. 9A shows the result of the suboptimization using the optimization angle of 25 degrees, FIG. 9B shows the result of the suboptimization using the optimization angle of 30 degrees, FIG. 9C shows the result of the suboptimization using the optimization angle of 35 degrees, FIG. 9D shows the result of the suboptimization using the optimization angle of 40 degrees, and FIG. 9E shows the result of the suboptimization using the optimization angle of 45 degrees.

In some embodiments, the objective function of equation 29, which incorporates the weak forms of the face overhang constraint and the point overhang constraint, can be used for each suboptimization. Additionally, automatic differentiation, such as the automatic differentiation features of the Pytorch Package, may be used in place of sensitivity analysis. During each suboptimization, $\lambda$ is gradually increased first, then w is gradually increased. As $\lambda$ is increased, the Heaviside function approaches the sharp step function, which makes the faces that violate overhang limits have a more significant contribution in the objective function, while those satisfying the overhang limits become negligible. In this way, the optimizer is guided to prioritize dealing with the regions that have the most violation of the overhang limit. The results shown in FIGS. 9A-9F show that the overall optimization process converges to a feasible solution wherein all of the overhang angles are below the overhang angle limit.

Figure 10:
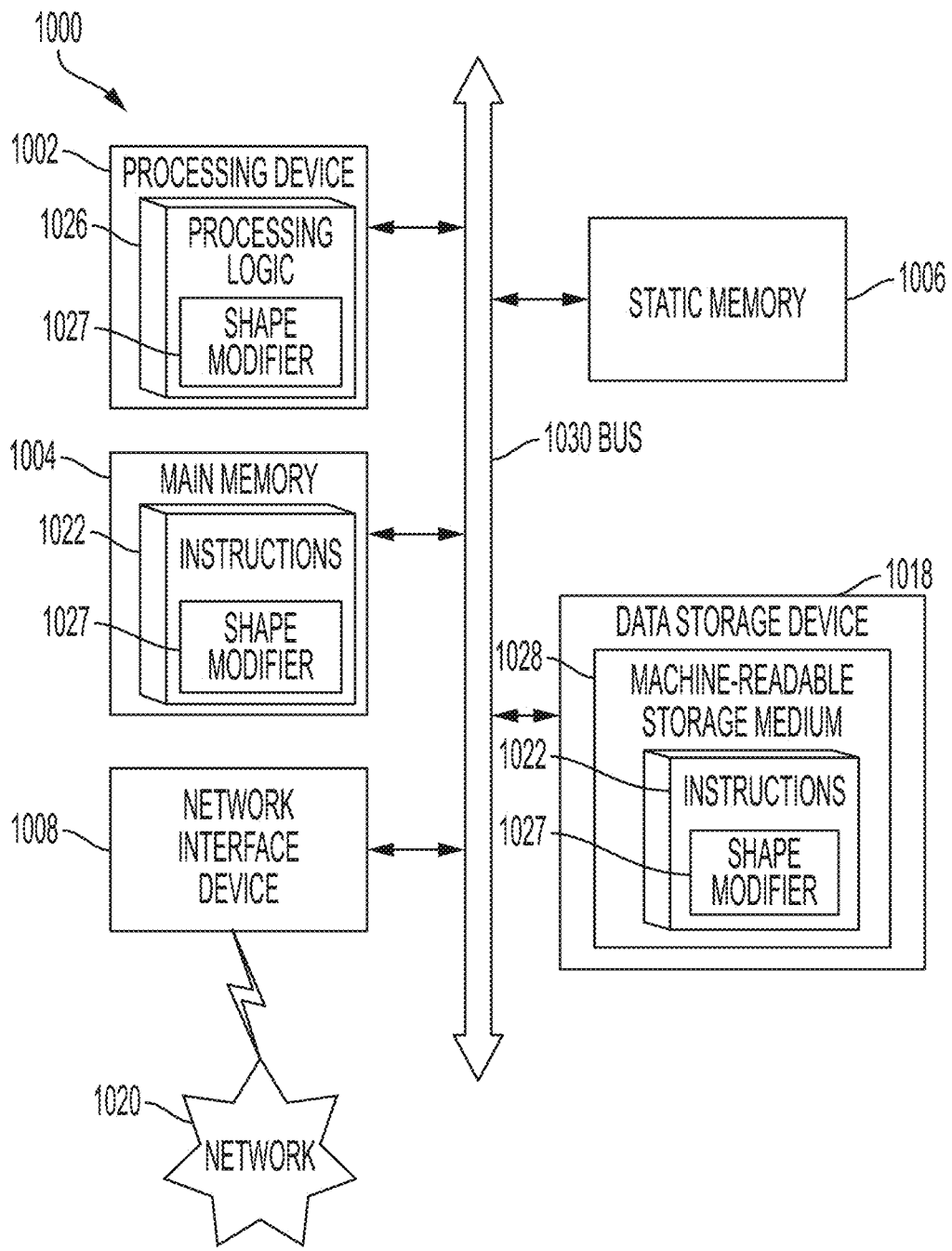
FIG. 10 illustrates a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computer system 1000 within which a set of instructions 1022, for causing the machine to perform any one or more of the methodologies discussed herein, may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may be representative of a server computer system, such as system 100.

The exemplary computer system 1000 includes a processing device 1002, a main memory 1004 (e.g., read-only memory (ROM), flash memory, dynamic random access memory (DRAM), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026, which may be one example of system 100 shown in FIG. 1, for performing the operations and steps discussed herein.

The data storage device 1018 may include a machine-readable storage medium 1028, on which is stored one or more set of instructions 1022 (e.g., software) embodying any one or more of the methodologies of functions described herein, including instructions to cause the processing device 1002 to execute system 100. The instructions 1022 may also reside, completely or at least partially, within the main memory 1004 or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The non-transitory machine-readable storage medium 1028 may also be used to store instructions to perform the methods and operations described herein. While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. An apparatus for automatically modifying a 3-Dimensional (3D) object model, the apparatus comprising:
   a memory;
   a processing device coupled to the memory, wherein the processing device and the memory are configured to:
   obtain an input 3D object model comprising an input 3D mesh;
   analyze the input 3D mesh to identify unprintable overhangs that have an angle over an overhang angle limit and identify vertices associated with the unprintable overhangs as active vertices; and
   perform an optimization process to move the active vertices of the input 3D mesh to eliminate the unprintable overhangs and generate an output 3D mesh, wherein the optimization process is divided into a series of suboptimizations that each generate a modified 3D mesh resulting, eventually, the output 3D mesh;
   wherein at each suboptimization, the processing device is to:
   perform a gradient descent search algorithm on an objective function, wherein the objective function comprises a cost function that represents a difference between the input 3D mesh and the modified 3D mesh, and wherein the gradient descent search algorithm is to minimize the objective function to minimize the difference between the input 3D mesh and the modified 3D mesh subject to an overhang constraint comprising an optimization angle related to the overhang angle limit, wherein the modified 3D mesh is determined by multiplying a gradient of the objective function by a step size;
   perform a topology validation process to determine whether the modified 3D mesh is invalid due to an intersection of portions of the modified 3D mesh; and
   responsive to determining that the modified 3D mesh is not invalid and that the optimization angle is over the overhang angle limit, reduce the optimization angle to be used for the overhang constraint in the next suboptimization by an increment based on the step size.

2. The apparatus of claim 1, wherein the objective function further comprises a pseudo-energy regularization term configured to avoid mesh deformation.

3. The apparatus of claim 2, wherein the pseudo-energy regularization term is based on sphere packing.

4. The apparatus of claim 1, wherein the overhang constraint comprises a face overhang constraint that constrains an angle between a build direction and a normal vector of each face in the modified 3D mesh to be less than the overhang angle limit.

5. The apparatus of claim 1, wherein the overhang constraint comprises an edge overhang constraint that constrains an angle between a build direction and each edge in the modified 3D mesh to be less than the overhang angle limit.

6. The apparatus of claim 1, wherein the overhang constraint comprises a stalactite constraint imposed an any downward facing vertex of the modified 3D mesh to ensure that the downward facing vertex is not a local minimum among its neighboring vertices.

7. The apparatus of claim 1, wherein the gradient descent search algorithm is further subject to an outward constraint that restricts movement of any vertex in the modified 3D mesh to be in an outward directed compared to a surface of the input 3D mesh.

8. The apparatus of claim 1, wherein the overhang constraint is a weak form of a face overhang constraint defined as a sum of a Heaviside function which is incorporated into the objective function.

9. A method for automatically modifying a 3-Dimensional (3D) object model, the method comprising:
obtaining an input 3D object model comprising an input 3D mesh;
analyzing the input 3D mesh to identify unprintable overhangs that have an angle over an overhang angle limit and identify vertices associated with the unprintable overhangs as active vertices; and
performing an optimization process to move the active vertices of the input 3D mesh to eliminate the unprintable overhangs and generate an output 3D mesh, wherein the optimization process is divided into a series of suboptimizations that each generate a modified 3D mesh resulting, eventually, the output 3D mesh;
wherein performing the optimization process comprises:
performing a gradient descent search algorithm on an objective function, wherein the objective function comprises a cost function that represents a difference between the input 3D mesh and the modified 3D mesh, and wherein the gradient descent search algorithm is to minimize the objective function to minimize the difference between the input 3D mesh and the modified 3D mesh subject to an overhang constraint comprising an optimization angle related to the overhang angle limit, wherein the modified 3D mesh is determined by multiplying a gradient of the objective function by a step size;
performing a topology validation process to determine whether the modified 3D mesh is invalid due to an intersection of portions of the modified 3D mesh; and
responsive to determining that the modified 3D mesh is not invalid and that the optimization angle is over the overhang angle limit, reducing the optimization angle to be used for the overhang constraint in the next suboptimization by an increment based on the step size.

10. The method of claim 9, wherein the objective function further comprises a pseudo-energy regularization term configured to avoid mesh deformation.

11. The method of claim 10, wherein the pseudo-energy regularization term is based on sphere packing.

12. The method of claim 9, wherein the overhang constraint comprises a face overhang constraint that constrains an angle between a build direction and a normal vector of each face in the modified 3D mesh to be less than the overhang angle limit.

13. The method of claim 9, wherein the overhang constraint comprises an edge overhang constraint that constrains an angle between a build direction and each edge in the modified 3D mesh to be less than the overhang angle limit.

14. The method of claim 9, wherein the overhang constraint comprises a stalactite constraint imposed on any downward facing vertex of the modified 3D mesh to ensure that the downward facing vertex is not a local minimum among its neighboring vertices.

15. The method of claim 9, wherein the gradient descent search algorithm is further subject to an outward constraint that restricts movement of any vertex in the modified 3D mesh to be in an outward directed compared to a surface of the input 3D mesh.

16. The method of claim 9, wherein the overhang constraint is a weak form of a face overhang constraint defined as a sum of a Heaviside function which is incorporated into the objective function.

17. A non-transitory computer-readable storage medium having instructions stored thereon that, when executed by a processing device for automatically modifying a 3-Dimensional (3D) object model, cause the processing device to:
obtain an input 3D object model comprising an input 3D mesh;
analyze the input 3D mesh to identify unprintable overhangs that have an angle over an overhang angle limit and identify vertices associated with the unprintable overhangs as active vertices; and
perform an optimization process to move the active vertices of the input 3D mesh to eliminate the unprintable overhangs and generate an output 3D mesh, wherein the optimization process is divided into a series of suboptimizations that each generate a modified 3D mesh resulting, eventually, the output 3D mesh;
wherein at each suboptimization, the processing device is to:
perform a gradient descent search algorithm on an objective function, wherein the objective function comprises a cost function that represents a difference between the input 3D mesh and the modified 3D mesh, and wherein the gradient descent search algorithm is to minimize the objective function to minimize the difference between the input 3D mesh and the modified 3D mesh subject to an overhang constraint comprising an optimization angle related to the overhang angle limit, wherein the modified 3D mesh is determined by multiplying a gradient of the objective function by a step size;
perform a topology validation process to determine whether the modified 3D mesh is invalid due to an intersection of portions of the modified 3D mesh; and
responsive to determining that the modified 3D mesh is not invalid and that the optimization angle is over the overhang angle limit, reduce the optimization angle to be used for the overhang constraint in the next suboptimization by an increment based on the step size.

18. The non-transitory computer-readable storage medium of claim 17, wherein the objective function further comprises a pseudo-energy regularization term configured to avoid mesh deformation.

19. The non-transitory computer-readable storage medium of claim 18, wherein the pseudo-energy regularization term is based on sphere packing.

20. The non-transitory computer-readable storage medium of claim 17, wherein the overhang constraint comprises a face overhang constraint that constrains an angle between a build direction and a normal vector of each face in the modified 3D mesh to be less than the overhang angle limit.

21. The non-transitory computer-readable storage medium of claim 17, wherein the overhang constraint comprises an edge overhang constraint that constrains an angle between a build direction and each edge in the modified 3D mesh to be less than the overhang angle limit.

22. The non-transitory computer-readable storage medium of claim 17, wherein the overhang constraint comprises a stalactite constraint imposed on any downward facing vertex of the modified 3D mesh to ensure that the downward facing vertex is not a local minimum among its neighboring vertices.

23. The non-transitory computer-readable storage medium of claim 17, wherein the gradient descent search algorithm is further subject to an outward constraint that restricts movement of any vertex in the modified 3D mesh to be in an outward directed compared to a surface of the input 3D mesh.

24. The non-transitory computer-readable storage medium of claim 17, wherein the overhang constraint is a weak form of a face overhang constraint defined as a sum of a Heaviside function which is incorporated into the objective function.

\* \* \* \* \*